(12) United States Patent
Kim et al.

(10) Patent No.: US 11,515,094 B2
(45) Date of Patent: Nov. 29, 2022

(54) MULTILAYER CAPACITOR AND BOARD HAVING THE SAME MOUNTED THEREON

(71) Applicant: SAMSUNG ELECTRO-MECHANICS CO., LTD., Suwon-si (KR)

(72) Inventors: Hwi Dae Kim, Suwon-si (KR); Ji Hong Jo, Suwon-si (KR); Woo Chul Shin, Suwon-si (KR); Chan Yoon, Suwon-si (KR); Sang Soo Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 57 days.

(21) Appl. No.: 16/774,569

(22) Filed: Jan. 28, 2020

(65) Prior Publication Data
US 2021/0020371 A1   Jan. 21, 2021

(30) Foreign Application Priority Data

Jul. 17, 2019  (KR) .................. 10-2019-0086597

(51) Int. Cl.
*H01G 4/30* (2006.01)
*H01G 2/02* (2006.01)
(Continued)

(52) U.S. Cl.
CPC ............... *H01G 4/30* (2013.01); *H01G 2/02* (2013.01); *H01G 4/012* (2013.01); *H01G 4/1209* (2013.01)

(58) Field of Classification Search
CPC ...... H01G 4/248; H01G 4/012; H01G 4/2325; H01G 4/1227; H01G 2/02; H01G 4/1209;
(Continued)

(56) References Cited

U.S. PATENT DOCUMENTS

2013/0250472 A1    9/2013  Lee
2015/0155097 A1*   6/2015  Kim ................ H01G 4/232
                                                   174/260
(Continued)

FOREIGN PATENT DOCUMENTS

| CN | 107644736 A | 1/2018 |
| CN | 108288544 A | 7/2018 |
| KR | 10-1761936 B1 | 7/2017 |

OTHER PUBLICATIONS

Chinese Office Action dated Sep. 13, 2022, issued in corresponding Chinese Patent Application No. 202010264538.9.

*Primary Examiner* — Arun Ramaswamy
(74) *Attorney, Agent, or Firm* — Morgan, Lewis & Bockius LLP

(57) ABSTRACT

A multilayer capacitor and a board having the multilayer capacitor mounted thereon are provided. The multilayer capacitor includes a capacitor body including a dielectric layer and first and second internal electrodes, and first and second external electrodes disposed on both ends of the capacitor body and connected to exposed portions of the first and second internal electrodes, respectively. A/B satisfies 0.0016≤A/B<1 in which A is a thickness of the dielectric layer and B is an average length of margins of the capacitor body in a length direction, and A is 1 μm or less.

29 Claims, 6 Drawing Sheets

(51) Int. Cl.
 *H01G 4/12* (2006.01)
 *H01G 4/012* (2006.01)
(58) Field of Classification Search
 CPC .......... H01G 4/005; H01G 4/30; H01G 4/018;
 H01G 4/1208
 USPC ..................... 361/303, 301.4, 321.1, 311
 See application file for complete search history.

(56) References Cited

U.S. PATENT DOCUMENTS

| | | | | |
|---|---|---|---|---|
| 2016/0020028 | A1* | 1/2016 | Katsuta | H01G 4/2325 |
| | | | | 361/301.4 |
| 2016/0240311 | A1* | 8/2016 | Lee | H01G 4/232 |
| 2016/0240314 | A1* | 8/2016 | Fujii | H01G 4/35 |
| 2016/0284473 | A1* | 9/2016 | Murosawa | H01G 4/1209 |
| 2017/0092424 | A1* | 3/2017 | Morito | H01G 4/228 |
| 2017/0243695 | A1* | 8/2017 | Kim | H01G 4/248 |
| 2017/0345567 | A1* | 11/2017 | Sakate | H01G 4/1218 |
| 2018/0027658 | A1 | 1/2018 | Choi et al. | |
| 2019/0385794 | A1* | 12/2019 | Yanagisawa | H01G 4/1245 |

\* cited by examiner

MULTILAYER CAPACITOR AND BOARD HAVING THE SAME MOUNTED THEREON

CROSS-REFERENCE TO RELATED APPLICATION(S)

The present application claims the benefit of priority to Korean Patent Application No. 10-2019-0086597 filed on Jul. 17, 2019 in the Korean Intellectual Property Office, the entire disclosure of which is incorporated herein by reference.

TECHNICAL FIELD

The present disclosure relates to a multilayer capacitor and a board having the same mounted thereon.

BACKGROUND

Multilayer Ceramic Capacitors (MLCCs) are passive components that control electrical signals in a circuit.

The primary role of multilayer capacitors is to accumulate charge in electrodes, block a direct current (DC) signal, and serve as a filter to pass an alternating current (AC) signal.

In other words, a multilayer capacitor bypasses and eliminates AC noise in a power line to stabilize the operation of an IC.

Various methods have been attempted to increase the capacity of such MLCCs.

For example, a method of increasing the dielectric constant of a dielectric material, reducing the thickness of the dielectric material, or increasing the area in which internal electrodes overlap has been provided.

However, when the area in which the internal electrodes overlap is increased, the margin in the length direction or the width direction of the product may be reduced. If the amount of margin reduction is too great, a problem may occur in that electric field characteristics may be weakened.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a multilayer capacitor in which a margin of a capacitor body is suitable for preventing electric field characteristics from being deteriorated while the area of overlap of internal electrodes is increased, and a board having the same mounted thereon.

According to an aspect of the present disclosure, a multilayer capacitor includes a capacitor body including a dielectric layer and first and second internal electrodes; and first and second external electrodes disposed on both ends of the capacitor body and connected to exposed first ends of the first and second internal electrodes, respectively, in a length direction. When a thickness of the dielectric layer is defined as A and an average length of margins of the capacitor body in the length direction is defined as B, A is 1 μm or less, and A/B satisfies $0.0016 \leq A/B < 1$. The margins are dielectric portions of the capacitor body from respective second ends of the first and second internal electrodes, opposite to the first ends, to adjacent side surfaces of the capacitor body, respectively, in the length direction.

Each of the first and second internal electrodes may have a thickness of 0.4 μm or less.

The capacitor body may include first and second surfaces opposing each other, third and fourth surfaces connected to the first and second surfaces and opposing each other, and fifth and sixth surfaces connected to the first and second surfaces and connected to the third and fourth surfaces, and the first and second internal electrodes are respectively exposed through the third and fourth surfaces of the capacitor body in the length direction, with the dielectric layer interposed between the first and second internal electrodes.

The first and second external electrodes may include, first and second connection portions disposed on the third and fourth surfaces of the capacitor body and connected to the exposed first ends of the first and second internal electrodes, respectively, and first and second band portions extending in the length direction from the first and second connection portions, respectively, onto portions of the first surface of the capacitor body.

Each of the first and second band portions further extends onto portions of the second, fifth, and sixth surfaces.

A plating layer may be disposed to cover each of the first and second external electrodes. The plating layer may comprise a nickel plating layer and a tin plating layer.

The dielectric layer may have a thickness of 1 μm and A/B may satisfy $0.002 \leq A/B \leq 0.2$.

The dielectric layer may have a thickness of 0.4 μm and A/B may satisfy $0.0016 \leq A/B \leq 0.5$.

The average length of the margins of the capacitor body in the length direction may be 0.8 to 500 μm.

According to an aspect of the present disclosure, a board having a multilayer capacitor mounted thereon includes a substrate having one surface on which first and second electrode pads are disposed, and the multilayer capacitor described above, mounted in such a manner that first and second external electrodes are disposed on the first and second electrode pads to be connected thereto, respectively.

According to another aspect of the present disclosure, a multilayer capacitor includes a capacitor body including alternately stacked first internal electrodes and second internal electrodes laminated with dielectric layers interposed therebetween. Each first internal electrode and each second internal electrode have first ends exposed through first and second side surfaces of the capacitor body, respectively, and second ends each opposing the respective first end in a length direction. The capacitor body further includes a first side margin portion defined as a dielectric portion arranged between each second end of the first internal electrodes and the second side surface of the capacitor body; and a second side margin portion defined as another dielectric portion arranged between each second end of the second internal electrodes and the first side surface of the capacitor body. When A is an interval between adjacent layers of the first and second internal electrodes and B is an average length of the first side margin portion or the second side margin portion in the length direction, A is 1 μm or less, and A/B satisfies $0.0016 \leq A/B < 1$.

The multilayer capacitor further includes first and second external electrodes respectively disposed on the first and second side surfaces of the capacitor body and respectively connected to the exposed first ends of the first and second internal electrodes.

The capacitor body includes: an upper margin portion including one or more dielectric layers and disposed above an uppermost layer of the first and second internal electrodes in a stacking direction thereof; and a lower margin portion including one or more dielectric layers and disposed below a lowermost layer of the first and second internal electrodes in the stacking direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
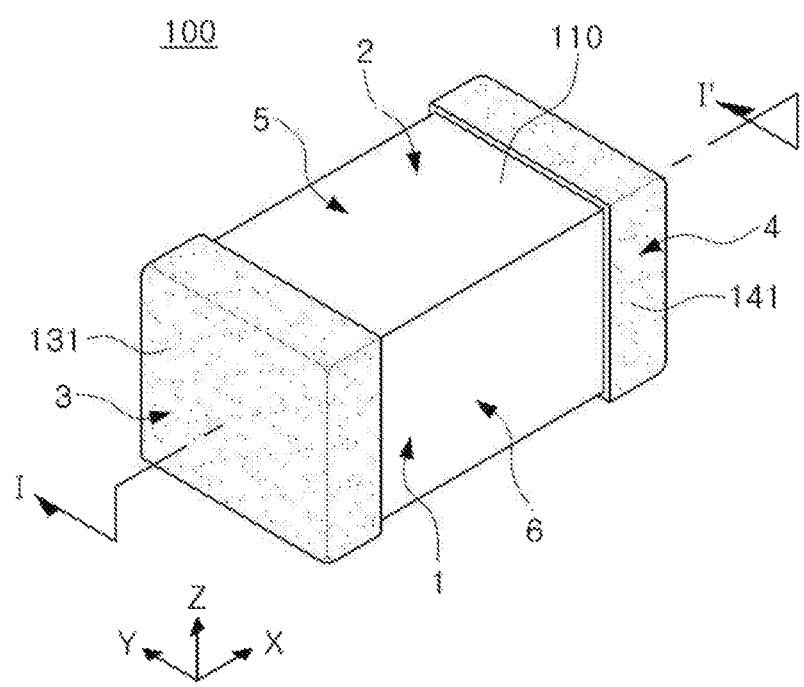
FIG. 1 is a perspective view schematically illustrating a multilayer capacitor according to an exemplary embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

Subsequently, examples are described in further detail with reference to the accompanying drawings.

Hereinafter, when defining the direction of a capacitor body 110 to clearly describe the embodiment, X, Y and Z illustrated in the drawings indicate the length direction, width direction and thickness direction of the capacitor body 110, respectively. In addition, in the embodiment, the Z direction may be used in the same concept as a stacking direction in which dielectric layers are stacked.

Figure 2A:
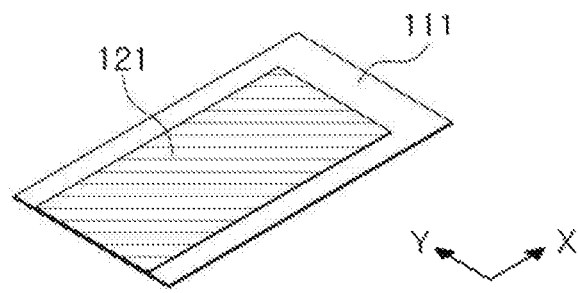
FIGS. 2A and 2B are plan views illustrating first and second internal electrodes applied to the multilayer capacitor of FIG. 1, respectively.
Figure 2B:
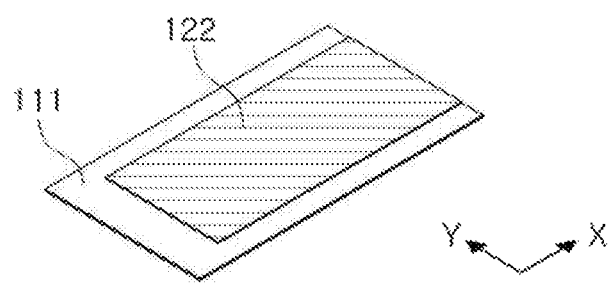
Figure 3:
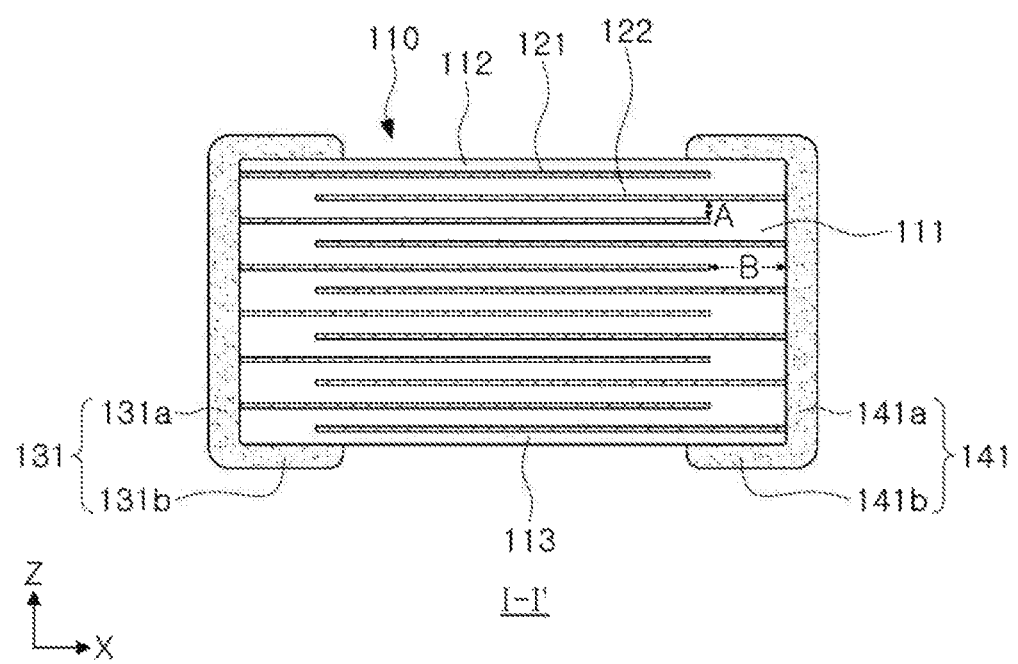
FIG. 3 is a cross-sectional view taken along line I-I' of FIG. 1.

FIG. 1 is a perspective view schematically illustrating a multilayer capacitor according to an exemplary embodiment of the present disclosure, FIGS. 2A and 2B are plan views illustrating first and second internal electrodes applied to the multilayer capacitor of FIG. 1, respectively, and FIG. 3 is a cross-sectional view taken along line I-I' of FIG. 1.

Referring to FIGS. 1 to 3, a multilayer capacitor 100 according to an exemplary embodiment of the present disclosure includes a capacitor body 110 including a dielectric layer 111 and a plurality of first and second internal electrodes 121 and 122, and first and second external electrodes 131 and 141 disposed on both ends of the capacitor body 110 and connected to exposed portions of the first and second internal electrodes 121 and 122, respectively, in a length direction (e.g., X direction).

In this case, when the thickness of the dielectric layer 111 is defined as A and the length of a margin in an X direction of the capacitor body 110 is defined as B, A is 1 µm or less, and a ratio (A/B) of the thickness of the dielectric layer with respect to the length of the margin of the capacitor body 110 in the X direction may satisfy 0.0016≤A/B<1.

The capacitor body 110 is obtained by stacking a plurality of dielectric layers 111 in the Z direction, followed by firing, such that the dielectric layers 111 adjacent to each other may be integrated with each other, such that boundaries therebetween may be difficult to confirm without using a scanning electron microscope (SEM).

In this case, the capacitor body 110 may be substantially hexahedral, but an embodiment thereof is not limited thereto.

The shape, the dimensions of the capacitor body 110, and the number of stacked layers of the dielectric layer 111 are not limited to those illustrated in the drawings of this embodiment.

In this embodiment, for convenience of description, two surfaces of the capacitor body 110 opposing each other in the Z direction are defined as first and second surfaces 1 and 2, two surfaces of the capacitor body 110 connected to the first and second surfaces 1 and 2 and opposing each other in the X direction are defined as third and fourth surfaces 3 and 4, and two surfaces of the capacitor body 110 connected to the first and second surfaces 1 and 2 and connected to the third and fourth surfaces 3 and 4 and opposing each other in the Y direction are defined as fifth and sixth surfaces 5 and 6.

In this embodiment, a mounting surface of the multilayer capacitor 100 may be the first surface 1 of the capacitor body 110.

The dielectric layer 111 may include a ceramic material having a high dielectric constant, for example, a barium titanate ($BaTiO_3$)-based or strontium titanate ($SrTiO_3$)-based ceramic powder, or the like, but the ceramic material is not limited thereto. For example, any ceramic material may be used as long as sufficient capacitance may be obtained therefrom.

In addition, a ceramic additive, an organic solvent, a plasticizer, a binder, a dispersant, and the like may be further added to the dielectric layer 111, together with the ceramic powder.

The ceramic additive may be, for example, a transition metal oxide or a transition metal carbide, a rare earth element, magnesium (Mg), aluminum (Al), or the like.

The capacitor body 110 may include an active region as a part contributing to the capacitance formation of the capacitor, and upper and lower covers 112 and 113 disposed on upper and lower portions of the active region in the Z direction, as upper and lower margins, respectively.

The upper and lower covers 112 and 113 may have the same material and configuration as those of the dielectric layer 111, except for not including internal electrodes.

The upper and lower covers 112 and 113 may be formed by stacking a single dielectric layer or two or more dielectric layers on upper and lower surfaces of the active region in the Z direction, respectively, and may basically serve to prevent damage to the internal electrodes 121 and 122, due to physical or chemical stress.

The first and second internal electrodes 121 and 122 are electrodes that receive different polarities, and are alternately disposed in the Z direction with the dielectric layer 111 interposed therebetween, and one ends of the third and second internal electrodes 121 and 122 may be exposed through the third and fourth surfaces 3 and 4, respectively.

In this case, the first and second internal electrodes 121 and 122 may be electrically insulated from each other by the dielectric layer 111 disposed therebetween.

The end portions of the first and second internal electrodes 121 and 122 alternately exposed through the third and fourth surfaces 3 and 4 of the capacitor body 110 may be connected to the first and second external electrodes 131 and 141 disposed on the third and four surfaces 3 and 4 of the capacitor body 110 to be electrically connected thereto, respectively.

According to the above configuration, when a predetermined voltage is applied to the first and second external electrodes 131 and 141, charges are accumulated between the first and second internal electrodes 121 and 122.

In this case, the capacitance of the multilayer capacitor 100 is proportional to the area of overlap of the first and second internal electrodes 121 and 122 overlapping each other in the Z direction in the active region.

The material for forming the first and second internal electrodes 121 and 122 is not particularly limited. For example, precious metal materials such as platinum (Pt), palladium (Pd), palladium-silver (Pd—Ag) alloys or the like, and a conductive paste formed of at least one of nickel (Ni) and copper (Cu) may be used.

In this case, as a printing method of the conductive paste, a screen printing method, a gravure printing method or the like may be used, and an embodiment thereof is not limited thereto.

In this embodiment, the thicknesses of the first and second internal electrodes 121 and 122 may be 0.4 µm or less.

If the thickness of the first and second internal electrodes 121 and 122 exceeds 0.4 µm, it may be difficult to secure a design capacity properly.

Since the multilayer capacitor has a trend toward miniaturization and high capacitance, the thickness of the internal electrode may be, in detail, 0.4 µm or less, for miniaturization and high capacitance of the multilayer capacitor.

The first and second external electrodes 131 and 141 may be provided with voltages having different polarities, may be disposed on both ends of the capacitor body 110 in the X direction, and are connected to exposed portions of the first and second internal electrodes 121 and 122 to be electrically connected thereto, respectively.

The first external electrode 131 may include a first connection portion 131a and a first band portion 131b.

The first connection portion 131a is a portion disposed on the third surface 3 of the capacitor body 110 to be connected to the exposed portion of the first internal electrode 121, and the first band portion 131b is a portion extending from the first connection portion 131a to a portion of the first surface 1 of the capacitor body 110.

In this case, the first band portion 131b may further extend to portions of the fifth and sixth surfaces 5 and 6 and a portion of the second surface 2 of the capacitor body 110 to improve fixing strength.

The second external electrode 141 may include a second connection portion 141a and a second band portion 141b.

The second connection portion 141a is a portion disposed on the fourth surface 4 of the capacitor body 110 and connected to the exposed portion of the second internal electrode 122, and the second band portion 141b is a portion extending from the second connection portion 141a to a portion of the first surface 1 of the capacitor body 110.

In this case, the second band portion 141b may further extend to portions of the fifth and sixth surfaces 5 and 6 and a portion of the second surface 2 of the capacitor body 110 to improve fixing strength.

Figure 4:
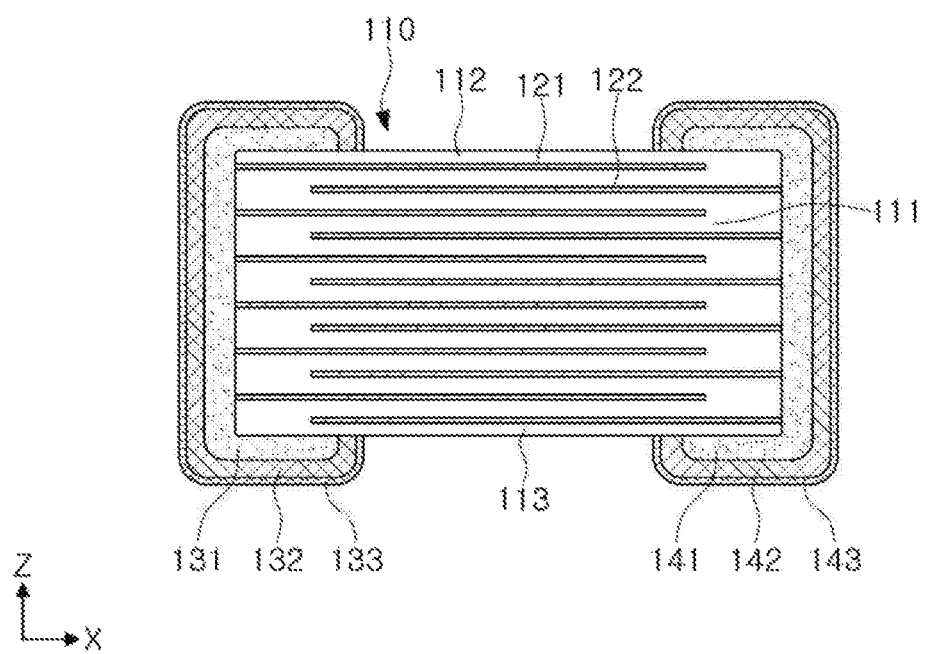
FIG. 4 is a cross-sectional view illustrating that a plating layer is further formed on an external electrode of FIG. 3.

As illustrated in FIG. 4, first and second plating layers may be further formed to cover the first and second external electrodes 131 and 141, respectively.

In this case, the first and second plating layers may include first and second nickel plating layers 132 and 142 disposed on surfaces of the first and second external electrodes 131 and 141, respectively, and first and second tin plating layers 133 and 143 covering the first and second nickel plating layers 132 and 142, respectively.

In this embodiment, A/B satisfies 0.0016≤A/B<1 when the thickness of the dielectric layer is defined as A and an average length of margins of the capacitor body 110 in the length direction is defined as B. The dimension A can be also defined as an interval between adjacent layers of the first and second internal electrodes 121 and 122.

As a result of checking the electric field behavior according to the X-direction margin length within the numerical range of A/B, it can be seen that the electric field characteristics are not deteriorated.

Therefore, the overlapped area between the first and second internal electrodes may be secured to a maximum within the numerical range of A/B, thereby providing a multilayer capacitor having a high capacity without occurrence of an electric field distortion phenomenon.

When the electric field distortion of the multilayer capacitor is reduced or prevented and an electric field value of the multilayer capacitor is thus reduced, defect such as breakdown voltage (BDV) of the multilayer capacitor may be prevented.

The thickness A of the dielectric layer may be, in detail, 1 μm or less.

For example, the multilayer capacitor of this embodiment may be a small-sized high capacity product in which a thickness A of the dielectric layer is 1 μm or less.

Since the multilayer capacitor has a trend toward miniaturization and high capacity, the thickness of the dielectric layer may be, in detail, 1 μm or less, for miniaturization and high capacity of the multilayer capacitor.

Table 1 below illustrates the measurement of a maximum electric field depending on a change of A/B value of the multilayer capacitor using Ansys Maxwell 2D Simulation.

Figure 5:
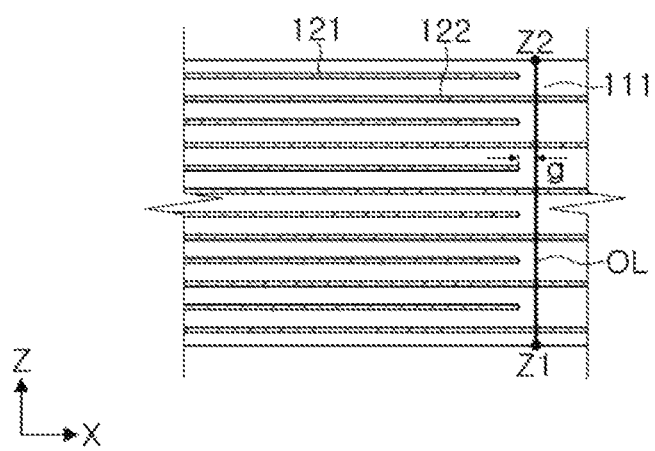
FIG. 5 is a cross-sectional view of a capacitor body illustrating a position of measuring an electric field in the electric field measurement test.

Referring to FIG. 5, the position at which the electric field is measured is measured at an observation line OL provided by drawing a vertical line between portions having a distance g of 0.5 μm from the end of the internal electrode.

In this case, g is a simulation by sampling only a portion of the multilayer capacitor.

In this case, the thickness A of the dielectric layer is 1 μm or 0.4 μm, and the distribution of the electric field of the multilayer capacitor is respectively confirmed while changing the margin B of the capacitor body of the multilayer capacitor in the X direction, as illustrated in Table 1.

TABLE 1

| # | A (μm) | B (μm) | A/B | Maximum Electric Field (V/μm) |
|---|---|---|---|---|
| 1 | 1 | 500 | 0.002 | 13.20 |
| 2 | 1 | 125 | 0.008 | 13.20 |
| 3 | 1 | 40 | 0.025 | 13.18 |
| 4 | 1 | 10 | 0.1 | 13.20 |
| 5 | 1 | 5 | 0.2 | 13.19 |
| 6 | 1 | 1 | 1.0 | 14.25 |
| 7 | 1 | 0.8 | 1.25 | 15.48 |

Table 1 illustrates a case in which the thickness of the dielectric layer is 1 μm. Referring to Table 1, in the case of #1 to #5 in which A/B values are between 0.002 and 0.2, a maximum electric field is about 13.18 to 13.20 V/μm, without significant difference.

Meanwhile, in the case of #6 with an A/B value of 1.0, distortion of an electric field is caused and the maximum electric field is 14.25 V/μm increased by about 7.35% as compared to the cases of #1 to #5.

In the case of #7 with A/B value of 1.25, the distortion of the electric field is greater than that of #6, and the maximum electric field is 15.48 V/μm, which is increased by about 14.72% compared to the cases of #1 to #5.

TABLE 2

| # | A (μm) | B (μm) | A/B | Maximum Electric Field (V/μm) |
|---|---|---|---|---|
| 8 | 0.4 | 250 | 0.0016 | 32.99 |
| 9 | 0.4 | 200 | 0.002 | 32.97 |
| 10 | 0.4 | 40 | 0.01 | 32.95 |
| 11 | 0.4 | 10 | 0.04 | 33.00 |
| 12 | 0.4 | 0.8 | 0.5 | 32.95 |
| 13 | 0.4 | 0.4 | 1.0 | 35.62 |
| 14 | 0.4 | 0.32 | 1.25 | 38.76 |

Table 2 illustrates a case in which the thickness of the dielectric layer is 0.4 μm. Referring to Table 2, in the case of #8 to #12 in which A/B values are between 0.0016 and 0.5, the maximum electric field ranges from about 32.95 to about 33.00 V/μm, from which it can be confirmed as being maintained without significant difference.

Meanwhile, in the case of #13 with an A/B value of 1.0, the distortion of the electric field is caused and the maximum electric field is 35.62 V/μm, which is increased by about 7.35% compared to the cases of #8 to #12.

In the case of #14 with an A/B value of 1.25, the distortion of the electric field is greater than that of #13, and the maximum electric field is about 38.76 V/μm, which is an increase of about 14.86% compared to the cases of #8 to #12.

Therefore, the multilayer capacitor of this embodiment has the characteristics of a small-sized high capacity product having a thin dielectric layer, and when the value of A/B is less than 1.0, a multilayer capacitor having stabilized electric field characteristics may be provided by suppressing the occurrence of electric field distortion while preventing a decrease in capacitance of the multilayer capacitor.

In a case in which the value of A/B is less than 0.0016, since the capacitance decreases while the overlap area of the upper and lower adjacent internal electrodes decreases, the value of A/B may be, in detail, 0.0016 or more.

Figure 6:
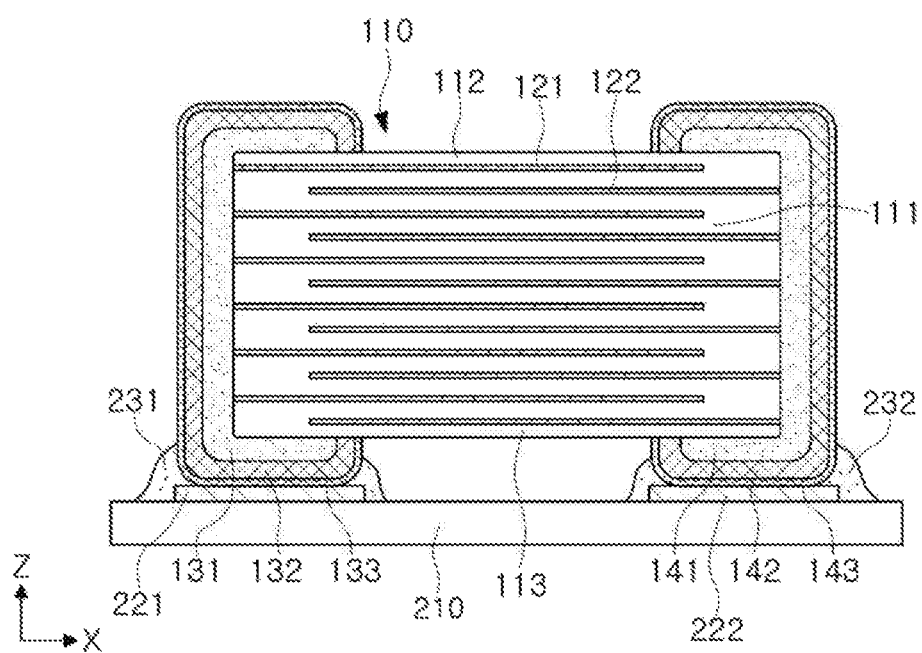
FIG. 6 is a cross-sectional view schematically illustrating a state in which the multilayer capacitor of FIG. 4 is mounted on a substrate.

Referring to FIG. 6, a board having a multilayer electronic component mounted thereon, according to an exemplary embodiment of the present disclosure, may include a substrate 210 on which first and second electrode pads 221 and 222 are mounted on one surface thereof, and a multilayer capacitor 100 mounted on an upper surface of the substrate 210, in such a manner that first and second tin plating layers 133 and 143 of the first and second external electrodes 131 and 141 are provided on the first and second electrode pads 221 and 222 to be connected thereto, respectively.

Although the multilayer capacitor 100 is illustrated and described as being mounted on the substrate 210 by solders 231 and 232, a conductive paste may be used instead of solder as required.

As set forth above, according to an exemplary embodiment of the present disclosure, by limiting the thickness of the dielectric layer with respect to the length of the margin of the capacitor body, the area in which the internal electrodes overlap is increased, thereby increasing the capacitance of the multilayer capacitor while preventing electric field distortion of the multilayer capacitor. By reducing the electric field value, defect of the multilayer capacitor such as breakdown voltage (BDV) may be prevented.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A multilayer capacitor comprising:
    a capacitor body including a dielectric layer and first and second internal electrodes; and
    first and second external electrodes disposed on both ends of the capacitor body and connected to exposed first ends of the first and second internal electrodes, respectively, in a length direction,
    wherein A is 0.4 μm or less, and A/B satisfies 0.04<A/B<1, in which A is an average thickness of the dielectric layer and B is an average length in μm of margins of the capacitor body in the length direction, the margins being portions of the dielectric layer from respective second ends of the first and second internal electrodes, opposite to the exposed first ends, to adjacent side surfaces of the capacitor body, respectively, in the length direction.

2. The multilayer capacitor of claim 1, wherein each of the first and second internal electrodes has an average thickness of 0.4 μm or less.

3. The multilayer capacitor of claim 1, wherein the capacitor body comprises first and second surfaces opposing each other, third and fourth surfaces connected to the first and second surfaces and opposing each other, and fifth and sixth surfaces connected to the first and second surfaces and connected to the third and fourth surfaces; and the first and second internal electrodes are respectively exposed through the third and fourth surfaces of the capacitor body in the length direction, with the dielectric layer interposed between the first and second internal electrodes.

4. The multilayer capacitor of claim 3, wherein the first and second external electrodes comprise:
    first and second connection portions disposed on the third and fourth surfaces of the capacitor body and connected to the exposed first ends of the first and second internal electrodes, respectively; and
    first and second band portions extending in the length direction from the first and second connection portions, respectively, onto portions of the first surface of the capacitor body.

5. The multilayer capacitor of claim 4, wherein each of the first and second band portions further extends onto portions of the second, fifth, and sixth surfaces.

6. The multilayer capacitor of claim 1, wherein a plating layer is disposed to cover each of the first and second external electrodes, and
    wherein each plating layer comprises a nickel plating layer and a tin plating layer.

7. The multilayer capacitor of claim 1, wherein A/B≤0.2.

8. The multilayer capacitor of claim 7, wherein the average length of the margins of the capacitor body in the length direction is 0.8 to 500 μm.

9. The multilayer capacitor of claim 1, wherein A is 0.4 μm and A/B≤0.5.

10. The multilayer capacitor of claim 9, wherein the average length of the margins of the capacitor body in the length direction is 0.8 to 500 μm.

11. A board having a multilayer capacitor mounted thereon, the board comprising:
    a substrate having one surface on which first and second electrode pads are disposed; and
    the multilayer capacitor of claim 1, mounted in such a manner that first and second external electrodes are disposed on the first and second electrode pads to be connected thereto, respectively.

12. A multilayer capacitor comprising:
    a capacitor body including alternately stacked first internal electrodes and second internal electrodes laminated with dielectric layers interposed therebetween,
    wherein each first internal electrode and each second internal electrode have first ends exposed through first and second side surfaces of the capacitor body, respectively, and second ends each opposing the respective first end in a length direction, wherein the capacitor body further includes:
    a first side margin portion defined as a portion of the dielectric layers arranged between each second end of the first internal electrodes and the second side surface of the capacitor body; and a second side margin portion defined as another portion of the dielectric layers arranged between each second end of the second internal electrodes and the first side surface of the capacitor body, and wherein A is 0.4 μm or less, and A/B satisfies 0.04<A/B<1, in which A is an interval between adjacent layers of the first and second internal electrodes and B is an average length in μm of the first side margin portion or the second side margin portion in the length direction.

13. The multilayer capacitor of claim 12, further comprising
    first and second external electrodes respectively disposed on the first and second side surfaces of the capacitor body and respectively connected to the exposed first ends of the first and second internal electrodes.

14. The multilayer capacitor of claim 12, wherein the capacitor body includes:
    an upper margin portion including one or more dielectric layers and disposed above an uppermost layer of the first and second internal electrodes in a stacking direction thereof; and
    a lower margin portion including one or more dielectric layers and disposed below a lowermost layer of the first and second internal electrodes in the stacking direction.

15. The multilayer capacitor of claim 12, wherein each of the first and second internal electrodes has an average thickness of 0.4 μm or less.

16. The multilayer capacitor of claim 12, wherein $A/B \leq 0.2$.

17. The multilayer capacitor of claim 16, wherein the average length of the first side margin portion or the second side margin portion in the length direction is 0.8 to 500 μm.

18. The multilayer capacitor of claim 12, wherein A is 0.4 μm and $A/B \leq 0.5$.

19. The multilayer capacitor of claim 18, wherein the average length of the first side margin portion or the second side margin portion is 0.8 to 500 μm.

20. A multilayer capacitor comprising:
    a capacitor body including a dielectric layer and first and second internal electrodes; and
    first and second external electrodes disposed on both ends of the capacitor body and connected to exposed portions of the first and second internal electrodes, respectively, wherein A/B satisfies 0.04 A/B<1.25, in which A is an average thickness of the dielectric layer and B is an average length in μm of margins of the capacitor body in the length direction, and wherein the dielectric layer has an average thickness of 0.4 μm or less.

21. The multilayer capacitor of claim 20, wherein $A/B \leq 1.0$.

22. The multilayer capacitor of claim 20, wherein $A/B \leq 0.5$.

23. The multilayer capacitor of claim 20, wherein $A/B \leq 0.2$.

24. The multilayer capacitor of claim 20, wherein the average length of the margins of the capacitor body in the length direction is 0.8 to 500 μm.

25. A multilayer capacitor comprising:
    a capacitor body including a dielectric layer and first and second internal electrodes; and
    first and second external electrodes disposed on both ends of the capacitor body and connected to exposed portions of the first and second internal electrodes, respectively, wherein A/B satisfies 0.04<A/B<1.25, in which A is an average thickness of the dielectric layer and B is an average length in μm of margins of the capacitor body in the length direction, and wherein each of the first and second internal electrodes and the dielectric layer have an average thickness of 0.4 μm or less.

26. The multilayer capacitor of claim 25, wherein $A/B \leq 1.0$.

27. The multilayer capacitor of claim 25, wherein $A/B \leq 0.5$.

28. The multilayer capacitor of claim 25, wherein $A/B \leq 0.2$.

29. The multilayer capacitor of claim 25, wherein the average length of the margins of the capacitor body in the length direction is 0.8 to 500 μm.

\* \* \* \* \*